United States Patent
Phillips et al.

(10) Patent No.: US 9,800,912 B2
(45) Date of Patent: Oct. 24, 2017

(54) ADAPTIVE VIDEO WHITE SPOT LEARNING AND USER BANDWIDTH DELIVERY CONTROL SYSTEM

(71) Applicant: Ericsson AB, Stockholm (SE)

(72) Inventors: Chris Phillips, Hartwell, GA (US); Charles Hammett Dasher, Lawrenceville, GA (US); Michael Huber, Täby (SE); Johan Kölhi, Vaxholm (SE)

(73) Assignee: ERICSSON AB, Stockholm (SE)

( * ) Notice: Subject to any disclaimer, the term of this patent is extended or adjusted under 35 U.S.C. 154(b) by 0 days.

(21) Appl. No.: 15/262,578

(22) Filed: Sep. 12, 2016

(65) Prior Publication Data
US 2016/0381113 A1    Dec. 29, 2016

Related U.S. Application Data

(63) Continuation of application No. 14/036,841, filed on Sep. 25, 2013, now Pat. No. 9,444,870.

(51) Int. Cl.
*H04N 21/258* (2011.01)
*H04L 29/06* (2006.01)
(Continued)

(52) U.S. Cl.
CPC ... *H04N 21/25841* (2013.01); *H04L 65/4069* (2013.01); *H04L 65/601* (2013.01);
(Continued)

(58) Field of Classification Search
CPC . H04L 65/604; H04L 65/4069; H04L 65/605; H04L 65/607; H04L 65/601;
(Continued)

(56) References Cited

U.S. PATENT DOCUMENTS 8,495,237 B1 * 7/2013 Bilinski ............. H04L 65/1083
709/224
2010/0121977 A1   5/2010 Kontola et al.
(Continued)

FOREIGN PATENT DOCUMENTS

EP         2790371 A1   10/2014
KR   10-2011-0084654   7/2011

OTHER PUBLICATIONS

GSM Association, "Advancing 3GPP Networks: Optimisation and Overload Management Techniques to Support Smart Phones", version 1.0, Jun. 2012.

*Primary Examiner* — Kwang B Yao
*Assistant Examiner* — Moo Ryong Jeong

(57) ABSTRACT

A system and method that utilize a learning system to maintain a set of geographical locations indicating an area where network data coverage is poor. When it is determined that a client device is moving towards such an area, the client is forced or instructed to switch to a lower delivery bitrate for video segments in order to force the client's Adaptive Bit Rate (ABR) playback buffer to fill itself with enough low-quality video segments to enable the client to cross the area without video playback interruption. Thus, the client mobile device may be preemptively forced to choose the lowest bitrate specified in a manifest file for the delivered video segments as the bitrate for downloading video segments when approaching the poor coverage area. Hence, the client device can maintain a minimum level of Quality of Service (QoS) when moving through network areas with poor data coverage.

12 Claims, 9 Drawing Sheets

(51) Int. Cl.
  *H04N 21/2343*  (2011.01)
  *H04N 21/24*  (2011.01)
  *H04N 21/61*  (2011.01)
  *H04N 21/845*  (2011.01)
  *H04N 21/6332*  (2011.01)
  *H04W 4/02*  (2009.01)
  *H04W 88/02*  (2009.01)

(52) U.S. Cl.
  CPC .......... *H04L 65/604* (2013.01); *H04L 65/605* (2013.01); *H04L 65/607* (2013.01); *H04N 21/23439* (2013.01); *H04N 21/2402* (2013.01); *H04N 21/6131* (2013.01); *H04N 21/6332* (2013.01); *H04N 21/8456* (2013.01); *H04W 4/02* (2013.01); *H04L 65/80* (2013.01); *H04W 88/02* (2013.01)

(58) Field of Classification Search
  CPC ................ H04L 65/80; H04N 21/6131; H04N 21/23439; H04N 21/2402; H04N 21/25841; H04N 21/8456; H04N 21/6332; H04W 4/02; H04W 88/02
  See application file for complete search history.

(56) References Cited

U.S. PATENT DOCUMENTS

| | | |
|---|---|---|
| 2010/0226263 A1 | 9/2010 | Chun et al. |
| 2011/0154409 A1 | 6/2011 | Rhee et al. |
| 2012/0009890 A1 | 1/2012 | Curcio et al. |
| 2013/0010624 A1 | 1/2013 | He et al. |
| 2013/0053047 A1* | 2/2013 | Rai ........................ H04W 16/18 455/448 |
| 2013/0060908 A1 | 3/2013 | Whitmyer, Jr. |
| 2013/0150007 A1 | 6/2013 | Wang et al. |
| 2013/0163430 A1 | 6/2013 | Gell et al. |
| 2014/0223502 A1* | 8/2014 | Doblmaier ......... H04N 21/4384 725/93 |
| 2014/0298394 A1 | 10/2014 | Kurihara |
| 2014/0372569 A1 | 12/2014 | Bouazizi |

* cited by examiner

ADAPTIVE VIDEO WHITE SPOT LEARNING AND USER BANDWIDTH DELIVERY CONTROL SYSTEM

PRIORITY CLAIM

This application is a continuation of pending U.S. patent application Ser. No. 14/036,841, filed on Sep. 25, 2013. The contents of these documents are hereby incorporated by reference herein.

TECHNICAL FIELD

The present disclosure relates to audio-visual data content delivery in a mobile communication network. More particularly, and not by way of limitation, particular embodiments of the present disclosure are directed to a system and method to maintain a dataset of geographical locations within a cellular network where network data coverage is less than desired, and to force a mobile terminal to utilize a lower bitrate for download of an audio-visual content delivered from the cellular network when it is determined that the mobile device is moving towards such a geographical location.

BACKGROUND

Adaptive Bit Rate (ABR) streaming is a technique used in streaming multimedia content over computer networks. Adaptive streaming technologies are primarily based on Hypertext Transfer Protocol (HTTP) and designed to work efficiently over large distributed HTTP networks, such as the Internet. Thus, in the discussion below, the terms "streamed" or "delivered" may be used interchangeably to refer to a multimedia content delivered through adaptive streaming, through ABR HTTP downloads, or through any other suitable network-based content delivery method.

In ABR streaming, a user's bandwidth and processing capacity are detected in real time, and the quality of video stream is adjusted accordingly. The source audio-visual content is encoded at multiple bitrates, and then each of the different bitrate streams is segmented into small multi-second (e.g., 2 to 10 seconds) parts. A manifest file is provided to the streaming client. The manifest file makes the client aware of the available streams at different bitrates, and segments of the streams. The player client can thus switch between streaming the different encodings depending on available network resources. For example, when the network throughput has deteriorated, the client may find that the download speed for a currently-downloaded segment is lower than the bitrate specified for that segment in the manifest file. In that event, the client may request that the next segment be at that lower bitrate. Similarly, if the client finds that the download speed of the currently-downloaded segment is greater than the manifest file-specified bitrate of the segment downloaded, then the client may request that next segments be at that higher bitrate.

Some examples of ABR streaming solutions include the MPEG-DASH standard (where "MPEG" refers to Moving Picture Experts Group and "DASH" refers to Dynamic Adaptive Streaming over HTTP), the HTTP Live Streaming (HLS) solution offered by Apple, Inc. for iPhones and iPads, and the Smooth Streaming solution offered by Microsoft, Inc.

It is noted here that the terms like "audio-visual content," "audio-visual segment," "video content," "video segment," and other terms of similar import are used interchangeably herein to primarily refer to data content having audio components, video components, or both.

In adaptive streaming, multiple versions of a video/audio-visual content are offered at different bitrates or quality levels (e.g., from 100 Kbps to 2 Mbps). Thus, video is transported not as one big file, but as separate, distinct chunks (e.g., by "cutting" up the video in small files), and user-agents are allowed to seamlessly switch between quality levels specified in a manifest file (e.g., based upon changing device or network conditions), simply by downloading the next chunk from a different bitrate level.

Thus, in ABR streaming, videos (or audio-visual data) are served as separate, small chunks, and the accompanying manifest file provides metadata needed for the client's ABR player. The manifest file may be an Extensible Markup Language (XML) file. The media server that provides the ABR streaming may automatically adapt to any changes in each user's network and playback conditions. A user agent (in the client's ABR player) may parse the manifest file to appropriately switch between different stream levels (or bitrates). The ABR mode of content delivery is useful in many applications such as, for example, long downloads of video content (where ABR streaming may save bandwidth if the user is not currently watching the video), live video feeds (where ABR streaming may maintain the stability of the content delivery), delivery to mobile devices (where lots of buffering may be needed due to changing network conditions).

Modern cellular radio networks provide for sending and receiving data—such as, for example, audio-visual data. As mentioned above, adaptive streaming technologies allow mobile devices in a cellular network to adjust or adapt to changes in bandwidth by switching between higher and lower quality video segments indicated within a manifest file.

SUMMARY

While mobile radio data network coverage is widespread, there are still many geographical areas or locations where data coverage is low (i.e., less than desired) or where there is an above-average amount of noise due to various factors such as structures, interference, and weather. While phone calls delivered over data networks can generally overcome these issues by switching to a different communication technology (such as the GSM/EDGE (where "GSM" refers to Global System for Mobile communications and "EDGE" refers to Enhanced Data Rate for GSM Evolution systems) or other network protocol), video delivered over data networks generally cannot.

Currently, adaptive streaming systems are unaware of a mobile device's radio interface—i.e., the condition or quality of radio signals through which the mobile device is sending or receiving data. As such, an ABR player client on the mobile device simply attempts to download streamed video segments when the device's playback buffer begins to empty. When the mobile device is consuming video via adaptive streaming while traveling through an area of low data coverage or high noise, the device is unable to continue to fill its playback buffer. As a result, the video playback stops.

It is therefore desirable to devise a mechanism that prevents such video playback failures resulting from a less-than-desired radio coverage in certain geographical locations within a cellular network. To support such mechanism, it is also desirable to maintain a database of geographical locations where network data coverage is low.

As a solution, particular embodiments of the present disclosure provide a system and method that utilize a learning system to maintain a data set of geographical locations where network data coverage is low (i.e., less than desired). When it is determined that a client (i.e., a mobile device) is moving towards such an area, the client is forced or instructed to switch to a lower bitrate stream of segments in order to force the client's playback buffer to fill itself with enough video segments to travel through or cross the area of low data coverage without video playback interruption.

In one embodiment, the present disclosure is directed to a method of building a database of geographical locations in a cellular network that have a less-than-desired radio coverage. The method comprises performing the following using a network entity in the cellular network: (i) for a mobile device operating in the cellular network and playing an audio-visual content through an adaptive streaming process, determining a minimum threshold bitrate authorized under the adaptive streaming process; (ii) monitoring whether a current audio-visual segment is being delivered to the mobile device at a delivery bitrate that is lower than the authorized minimum threshold bitrate; (iii) when the delivery bitrate is lower than the authorized minimum threshold bitrate, obtaining geographic location coordinates for the mobile device; and (iv) reporting the geographic location coordinates for storage into the database.

In another embodiment, the present disclosure is directed to a method for delivering an audio-visual content to a mobile device operating in a cellular network. The method comprises performing the following using a network entity in the cellular network: (i) monitoring a direction and speed of travel of the mobile device to ascertain whether the mobile device is approaching a geographical location in the cellular network that has a less-than-desired radio coverage; and (ii) when the mobile device is determined to be approaching the geographical location with the less-than-desired radio coverage, forcing the mobile device to switch to a delivery bitrate for receiving the audio-visual content, wherein the delivery bitrate is lower than a bitrate currently being used by the mobile device to receive the audio-visual content.

In a further embodiment, the present disclosure is directed to a network entity in a cellular network facilitating delivery of an audio-visual content to a mobile device operating in the cellular network. The network entity is configured to perform the following: (i) maintain access to a database that contains identifications of those geographical locations within the cellular network that have a less-than-desired radio coverage; (ii) monitor a direction and speed of travel of the mobile device and consult the database to ascertain whether the mobile device is approaching a geographical location in the cellular network that has the less-than-desired radio coverage; and (iii) when the mobile device is determined to be approaching the geographical location with the less-than-desired radio coverage, force the mobile device to receive the audio-visual content at a delivery bitrate that is lower than a bitrate currently being used by the mobile device to receive the audio-visual content.

In a still further embodiment, the present disclosure is directed to a mobile device that is operating in a cellular network and is configured to perform the following: (i) receive an audio-visual content from the cellular network at a first bitrate, wherein the first bitrate is specified in a manifest file associated with the audio-visual content; (ii) upon approaching a geographical location in the cellular network that has a less-than-desired radio coverage, receive an indication of a second bitrate from the cellular network, wherein the second bitrate is lower than the first bitrate; and (iii) upon receiving the indication, switch to the lowest bitrate specified in the manifest file to receive the audio-visual content regardless of the bitrate with which an audio-visual segment was delivered to the mobile device immediately prior to the switch.

Thus, an ABR streaming/delivery system according to certain embodiments of the present disclosure can rapidly adapt to ad-hoc issues such as inclement weather, structural interference, or any other kind of radio coverage interruption because of a pre-stored data set of geo-locations where network data coverage is low. Due to the forcing of the client mobile device to switch to a lower bitrate while traveling through a geographical area with low data coverage, the ABR content delivery system according to the teachings of the present disclosure allows the client device to maintain a certain minimum level of Quality of Service (QoS) when moving through network areas with spotty data coverage.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of a Third Generation Partnership Project (3GPP) cellular telephone/data network, but it can be implemented in other forms of cellular or non-cellular wireless networks as well.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "less-than-desired," "pre-defined," etc.) may be occasionally interchangeably used with its non-hyphenated version (e.g., "less than desired," "predefined," etc.), a capitalized entry (e.g., "Time of Arrival", "Downlink", etc.) may be interchangeably used with its non-capitalized version (e.g., "time of arrival," "downlink", etc.). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

Figure 1:
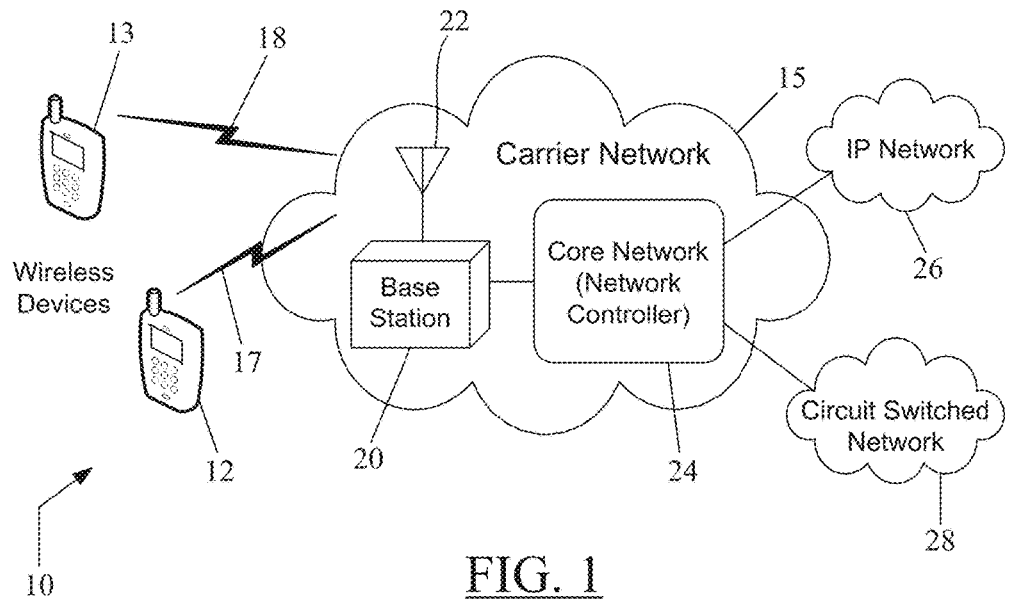
FIG. 1 illustrates an exemplary wireless system in which the ABR bitrate control methodology according to one embodiment of the present disclosure may be implemented.

FIG. 1 illustrates an exemplary wireless system 10 in which the ABR bitrate control methodology according to one embodiment of the present disclosure may be implemented. Two exemplary wireless or mobile devices 12, 13 are shown as being operational in the system 10 through a mobile communication network 15. In the discussion herein, the terms "wireless network," "mobile communication network," or "carrier network" may be used interchangeably to refer to a wireless communication network (e.g., a cellular network, a proprietary data communication network, a corporate-wide wireless network, etc.) facilitating voice and/or data communication with different types of wireless devices (like the devices 12-13). In one embodiment, each of the wireless devices 12-13 may be a User Equipment (UE) or a Mobile Station (MS) (also known by various analogous terms such as "mobile handset," "wireless handset," "mobile device," "mobile terminal," etc.) capable of receiving adaptively streamed/delivered audio-visual content from the network 15 and playing it using a local ABR player. Some examples of UEs or mobile handsets/devices include cellular telephones or data transfer equipments (e.g., a Personal Digital Assistant (PDA) or a pager), smartphones (e.g., iPhone™, Android™ phones, Blackberry™, etc.), handheld or laptop computers, Bluetooth® devices, electronic readers, portable electronic tablets, etc.

The wireless devices 12-13 in the system 10 are shown to be in wireless communication (via respective radio links 17-18) with the wireless network 15 through a base station (BS) (also interchangeably referred to herein as a "mobile communication node" or simply a "node") 20 of the network 15. The base station 20 may provide radio interface (in the form or Radio Frequency (RF) links 17-18) to devices 12-13 via an antenna unit 22. Thus, terminals operating in a wireless network may exchange information (which includes data, scheduling and control information, feedback information, etc.) via a base station in the network over a communication channel or link (e.g., an RF channel) between the base station and the wireless terminals. The wireless network 15 may be a dense network with a large number of wireless terminals operating therein. For ease of illustration, only two such devices 12-13 are shown in FIG. 1. The carrier network 15 may support stationary as well as mobile devices. The mobile communication network 15 may be a cellular carrier network operated, managed, and/or owned by a wireless service provider (or operator).

The base station 20 may be, for example, a base station in a Third Generation (3G) network, or an evolved Node-B (eNodeB or eNB) when the carrier network is a Third Generation Partnership Project's (3GPP) Long Term Evolution (LTE) network. In other embodiments, the base station 20 may also include a site controller, an access point (AP), a radio tower, or any other type of radio interface device capable of operating in a wireless environment. In addition to providing air interface or wireless channel (e.g., as represented by wireless links 17-18) to the devices 12-13 via antenna 22, the communication node (or base station) 20 may also perform radio resource management (as, for example, in case of an eNodeB in an LTE system).

In case of a 3G carrier network 15, the base station 20 may include functionalities of a 3G base station along with some or all functionalities of a 3G Radio Network Controller (RNC). Various base stations—whether 3G base stations or base stations in other types of carrier networks (e.g., Fourth Generation (4G) networks and beyond)—may be configured as discussed below to implement at least a portion of the ABR bitrate control solution according to particular embodiments of the present disclosure. For example, in one embodiment, the base station 20 may be configured (in hardware, via software, or both) to implement at least a portion of the ABR bitrate control methodology as discussed herein. For example, when existing hardware architecture of the base station 20 cannot be modified, the ABR bitrate control solution according to one embodiment of the present disclosure may be implemented through suitable programming of one or more processors and/or schedulers (e.g., processor 162 (or, more particularly, the processing unit 168) and scheduler 172 in FIG. 10) in the base station 20. The execution of the program code (by a processor and/or scheduler in the node 20) may cause the processor and scheduler to perform appropriate method steps illustrated in FIGS. 2A-2B, 3, and 6 (discussed later below).

The base station 20 may be part of an Access Network (AN) (not shown) portion of the carrier network 15. The AN may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN), a Worldwide Interoperability for Microwave Access (WiMAX) network, and the like. In case of a 3G RAN, for example, the base station 20 may include cellular backhaul (not shown) having functionalities of a 3G Radio Network Controller (RNC) or Base Station Controller (BSC). The base station 20 and some of the portions of its backhaul (such as, for example, a BSC or an RNC) may be considered to comprise the RAN portion of the network.

In case of cellular access, the term "access network" may include not only a RAN portion (comprising, for example, a base station with or without a base station controller) of a cellular carrier network, but other portions (e.g., cellular backhaul and core network) as well. As is understood, a cellular AN may include multiple cell sites (as shown, for example, in FIGS. 4 and 7), each under the radio coverage of a respective base station (BS) or base transceiver station (BTS).

The carrier network 15 may include a network controller 24 coupled to the base station 20 and providing logical and control functions (e.g., terminal mobility management, access to external networks or communication entities, subscriber account management, billing, delivery of streamed video content, etc.), Internet Protocol (IP) connectivity and interconnection to other networks (e.g., the Internet) or entities, roaming support, etc. In case of an LTE carrier network, the network controller 24 may be a Core Network (CN), which may include some or all functionalities of an Access Gateway (AGW) or an Evolved Packet Core (EPC). In certain embodiments, the CN 24 may be, for example, an IMT CN such as a 3GPP CN or a 3GPP2 CN (for Code Division Multiple Access (CDMA) based cellular systems), or an ETSI TISPAN (European Telecommunications Standards Institute TIPHON (Telecommunications and Internet Protocol Harmonization over Networks) and SPAN (Services and Protocols for Advanced Networks)) CN.

Regardless of the type of carrier network 15, the network controller 24 may function to provide connection of the base station 20 to other wireless terminals (not shown) operating in the carrier network 15 and also to other communication devices (e.g., wireline or wireless phones, computers, monitoring units, etc.) or resources (e.g., an Internet website) in other voice and/or data networks (not shown) external to the carrier network 15. In that regard, the network controller 24 may be coupled to a packet-switched network (e.g., the IP network 26, such as the Internet) as well as a circuit-switched network 28 (such as the Public-Switched Telephone Network (PSTN)) to accomplish the desired connections beyond the carrier network 15.

The carrier network 15 may be a cellular telephone network, a Public Land Mobile Network (PLMN), or a non-cellular wireless network (whether voice network, data network, or both). The wireless terminals—i.e., the UEs 12-13—may be subscriber units in the carrier network 15. Furthermore, portions of the carrier network 15 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 15 may be connected to the Internet via its core network's 24 connection to the IP network 26 or may include a portion of the Internet as part thereof. In one embodiment, the wireless network 15 may include more or less or different types of functional entities than those shown in FIG. 1.

The teachings of the present disclosure may apply to many different types of wireless networks 15 (cellular or non-cellular) such as, for example, IP-based 3GPP/3GPP2 cellular networks (including LTE networks), WiMAX systems, International Mobile Telecommunications-Advanced (IMT-Advanced) systems (e.g., LTE Advanced systems), etc., where ABR streaming of video or audio-visual content to network-based wireless devices is offered by the network.

In the discussion below, various actions (as shown, for example, in FIGS. 2A-2B, 3, and 6) according to the teachings of particular embodiments of the present disclosure are described to be performed by a "network entity" in the operator network 15 as part of maintaining a dataset of geo-locations where network data coverage is low and also as part of forcing a mobile client to switch to a lower bitrate for the delivered video content. Although FIGS. 4 and 7 depict a Radio Network Controller (RNC) as an example of such a "network entity," it is understood that in certain embodiments the term "network entity" may refer to a base station or BTS alone (with or without the functionalities of a BSC), or a core network alone, or a BSC, or a combination of a BS (with or without the functionalities of a BSC) and a CN. For example, in an LTE network, an eNB may be configured to perform the functions of a "network entity" discussed herein. Similarly, when certain RNC functionalities are implemented in a CN, the CN may represent the "network entity" described herein. If the RNC functionality according to particular embodiments of the present disclosure is distributed between a BS and a CN, then the below-described "network entity" may be a combination of such a BS and CN. On the other hand, if the RNC functionality is distributed among multiple base stations or a BS and some other node (not shown), such combination of nodes may then constitute the "network entity" discussed herein. Another entity (which may be IP-based) in the network 15 other than those mentioned above may be configured to perform as a "network entity" as per the teachings of the present disclosure. Furthermore, in the discussion below, although the network entity may be referred to as "performing," "accomplishing," or "carrying out" a function or process, such performance may be technically accomplished in hardware and/or software as desired.

Figure 2A:
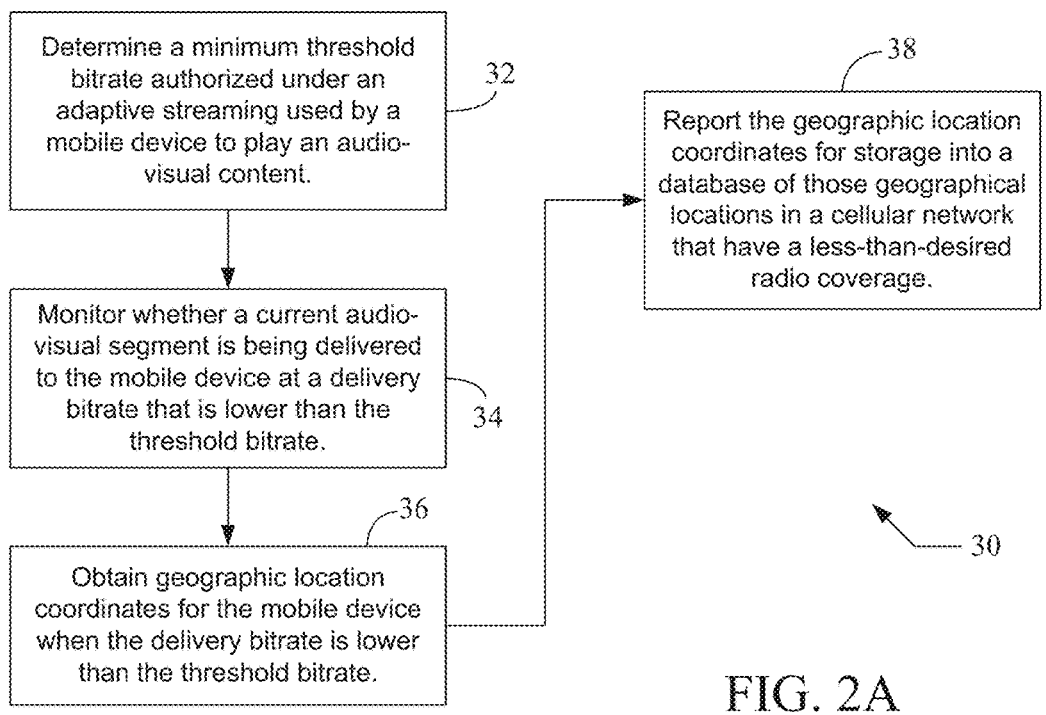
FIGS. 2A-2B show exemplary flowcharts depicting various steps of how the ABR bitrate may be preemptively controlled according to particular embodiments of the present disclosure.
Figure 2B:
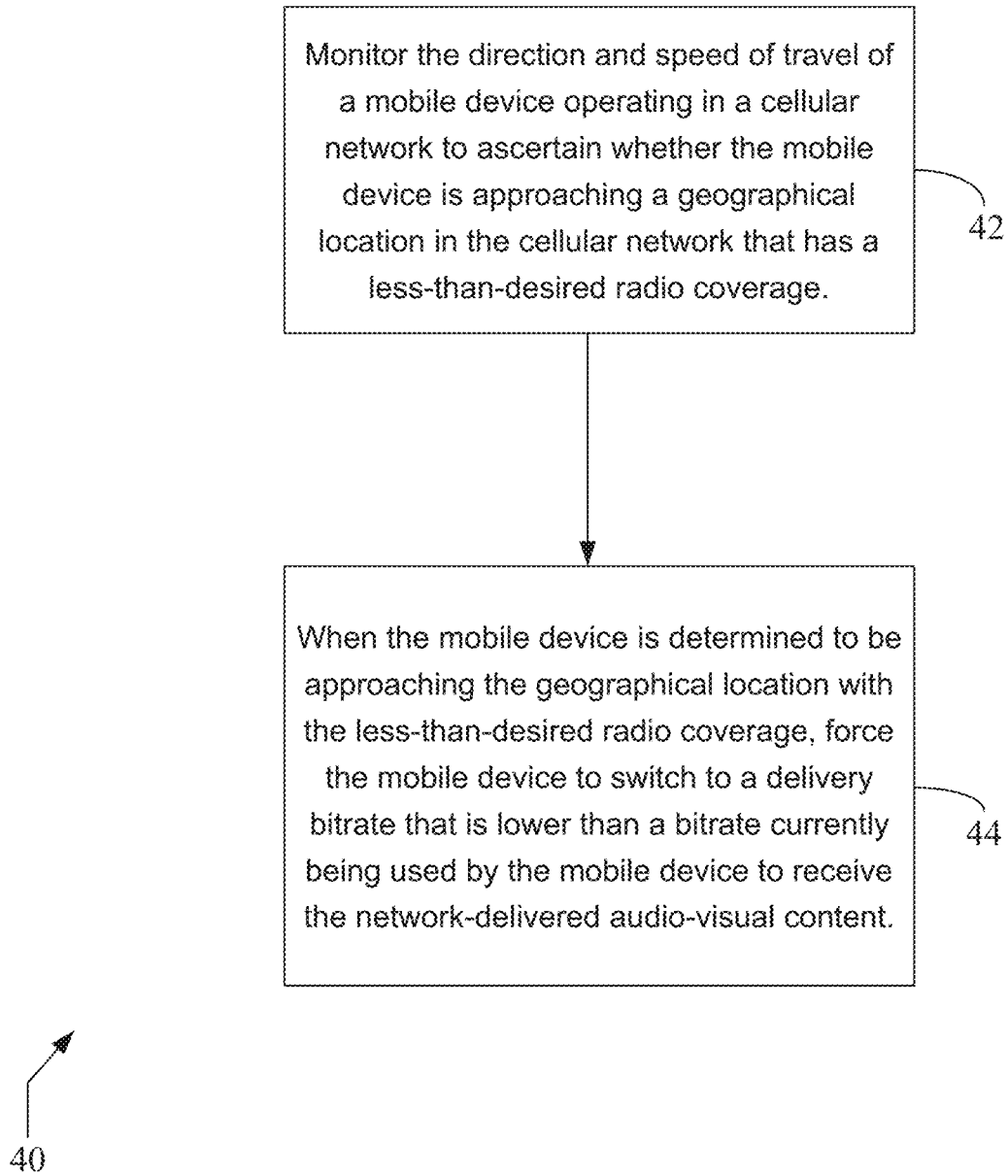

FIGS. 2A-2B show exemplary flowcharts 30, 40 depicting various steps of how the ABR bitrate may be preemptively controlled according to particular embodiments of the present disclosure. The flowchart 30 in FIG. 2A is a general depiction of the process of building a database of geographical locations in a cellular network that have a less-than-desired radio coverage. Additional details of this database building process are provided in FIGS. 3-5. On the other hand, the flowchart 40 in FIG. 2B is a general depiction of when the delivery bitrate of the network-delivered audio-visual content to a mobile device is controlled. Additional details of such forced control of ABR bitrate are provided in FIGS. 6-8.

As shown at block 32 in FIG. 2A, a network entity in the operator network 15 may initially determine a minimum threshold bitrate authorized under an adaptive streaming (i.e., ABR streaming) used by a mobile device (e.g., the mobile device 12) to play an audio-visual content. The network entity may then monitor whether a current audio-visual segment is being delivered to the mobile device at a delivery bitrate that is lower than the threshold bitrate (block 34). When the delivery bitrate of the current audio-visual segment is lower than the threshold bitrate, the network entity may obtain the geographic location coordinates for the mobile device (block 36) because such reduced delivery bitrate may indicate a radio outage condition. Thereafter, the network entity may report those geographical location coordinates for storage into a database (block 38), which may be configured to maintain a data set of geo-locations (e.g., in the form of location coordinates) in the network 15 that have a less-than-desired radio coverage.

Referring now to FIG. 2B, when a mobile device (e.g., the mobile device 13) is receiving ABR delivered audio-visual content in the network 15, a network entity in the operator's network 15 may monitor the direction and speed of travel of the mobile device to ascertain whether the mobile device is approaching a geographical location in the cellular network that has a less-than-desired radio coverage (block 42). When the network entity determines that the mobile device is indeed approaching such a low coverage area, the network entity may force the mobile device to switch to a delivery bitrate that is lower than a bitrate currently being used by the mobile device to receive the network-delivered audio-visual content (block 44).

Figure 3:
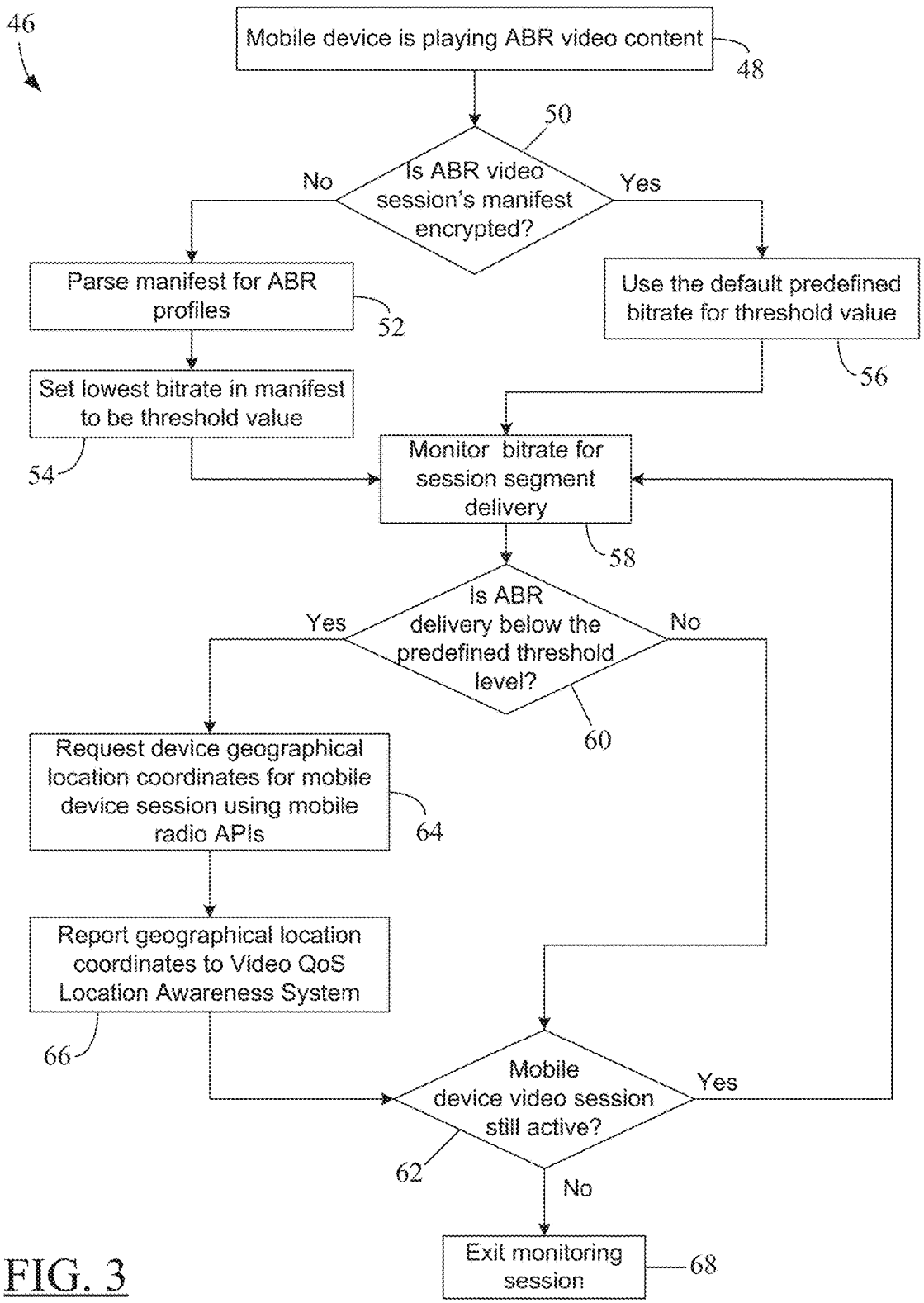
FIG. 3 is an exemplary flowchart depicting detailed steps of how a network entity may build and maintain a database of radio "white spots" in a wireless network as per the teachings of one embodiment of the present disclosure.
Figure 4:
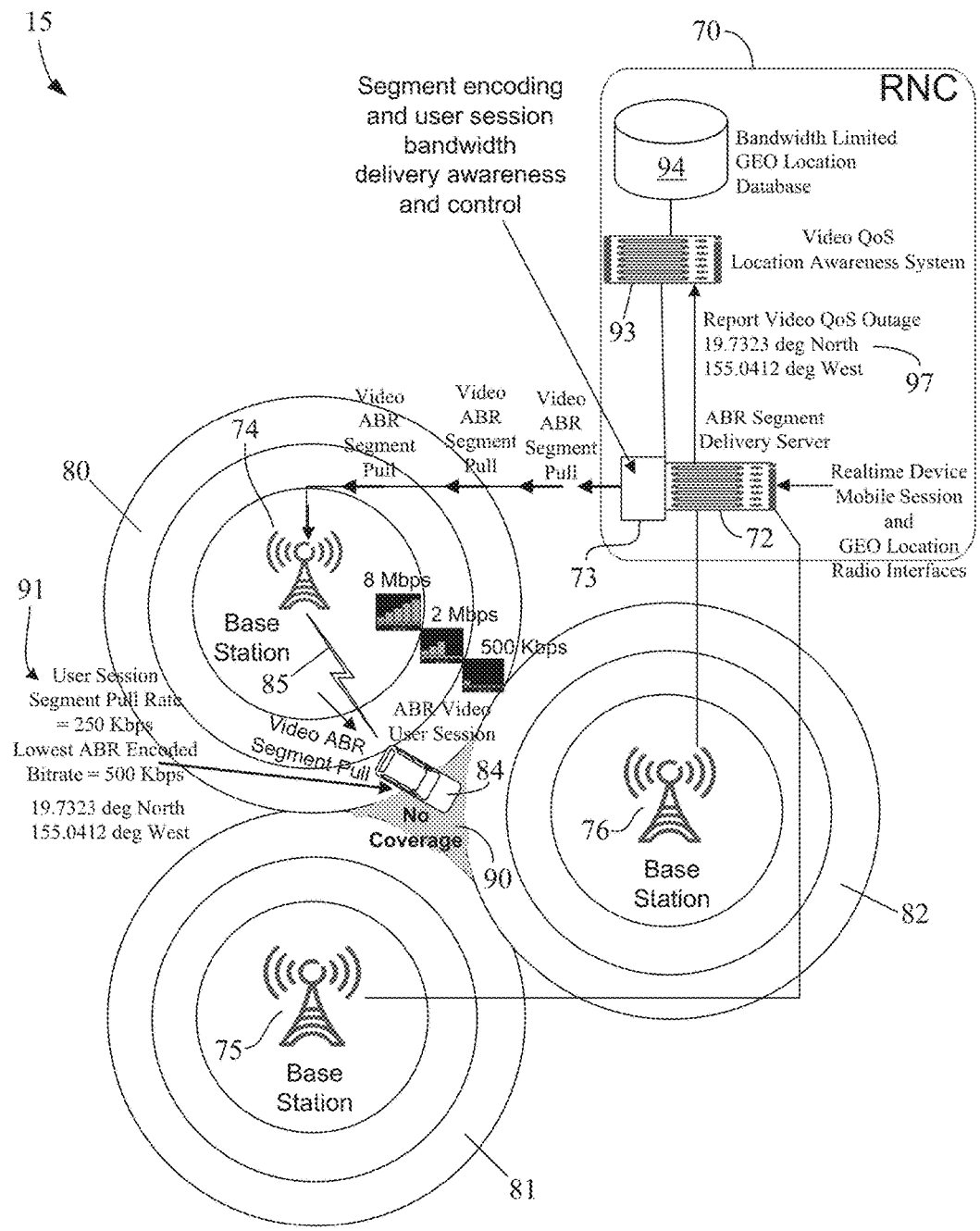
FIG. 4 pictorially illustrates how a network entity may determine presence and location of a radio quality drop spot in a wireless network.

FIG. 3 is an exemplary flowchart 46 depicting detailed steps of how a network entity (e.g., the RNC 70 in FIG. 4) may build and maintain a database of radio "white spots" (e.g., the database 94 in FIG. 4) in a wireless network (e.g., the network 15 in FIG. 1) as per the teachings of one embodiment of the present disclosure. A radio "white spot" may refer to a geographical location or area in the network 15 where radio outage may occur—i.e., where a mobile device (e.g., the mobile device 12) may experience low or less-than-desired radio coverage. For the sake of convenience, in the context of FIGS. 3-4, it is assumed that the network entity monitors the ABR segment delivery bitrate for the mobile device 12, as part of building a database of radio "white spots." On the other hand, in the context of FIGS. 6-8, it is assumed that the network entity monitors the movement of a different mobile device (e.g., the mobile device 13) to determine whether it is approaching a radio "white spot" and, based on the outage conditions learned through monitoring of content delivery to the other mobile devices (such as the mobile device 12) over a period of time, may preemptively control the ABR content delivery bitrate to such mobile device if the device is approaching or in the low coverage area. Although different UEs are discussed with reference to FIGS. 3-4 and 6-8, it is understood that the methodologies shown in FIGS. 3-4 and 6-8 may apply to each UE operating in the network 15 and playing a network-delivered ABR video content.

Various blocks in FIG. 3 are now discussed in conjunction with FIG. 4, which pictorially illustrates how a network entity (e.g., the RNC 70) may determine presence and location of a radio quality drop spot in a wireless network (e.g., the network 15). In the outage learning process of FIG. 3, the ABR delivery bitrate is monitored for each UE receiving network-delivered video content (block 48). As shown in FIG. 4, the RNC 70 may comprise an ABR segment delivery server 72 that delivers ABR video content to UEs through adaptive streaming or ABR Hypertext Transfer Protocol (HTTP) progressive downloads. The video content may originate from sources external to the network 15. A Segment Encoding and User Session Bandwidth Delivery Awareness and Control module 73 (also referred to here in as a "delivery module") may monitor delivery bitrate/bandwidth for the video content delivered by the server 72 as discussed in more detail below. In one embodiment, the delivery module 73 may be part of the server 72 (which may provide manifest files for the video segments delivered to the UEs via ABR streaming). In FIG. 4, three exemplary base stations 74-76 are shown as part of the carrier network 15 and communicatively coupled to the RNC 70. The respective radio coverage areas 80-82 associated with each base station 74-76 are symbolically shown using concentric circles around the corresponding base station. Each base station 74-76 may be similar to the base station 20 in FIG. 1 and, hence, the base stations 74-76 are not additionally described herein. In FIG. 4, the base station 74 may be serving the UE 12. Other base stations 75-76 may similarly serve other UEs (not shown). The UE 12 may be present in an automobile/vehicle 84 (FIG. 4) and may be playing ABR video content (block 48, FIG. 3) received from the base station 74 over a radio link 85 for its user. As discussed earlier, in ABR streaming, a client device (here, the UE 12) may play the ABR video content based on the bitrate specified in a manifest file (not shown) associated with the delivered video content.

The network entity (here, the RNC 70 and, more specifically, the delivery module 73) may initially determine at block 50 (FIG. 3) if the ABR video session's manifest file is encrypted. If the manifest file is not encrypted, the module 73 may parse the manifest file for ABR profiles (block 52)—i.e., the bitrates specified in the manifest file. The module 73 may then determine a minimum threshold bitrate "authorized" in the manifest file. The system may "set" or treat the lowest bitrate in the manifest file as this minimum threshold value (block 54). On the other hand, if the manifest file is encrypted (block 50), then the module 73 may use a default predefined bitrate for this minimum threshold value (block 56). Such default predefined bitrate may be configured based on a number of factors such as, for example, prior observations of "typical" lowest bitrates in unencrypted manifest files associated with video contents similar in nature to the video content currently being delivered with an encrypted manifest file, actually-used lowest bitrates for delivery of this type of video content (with encrypted manifest file) to other customers/users over a given period of time, etc. Once the threshold values are established at blocks 54 or 56 (as applicable), the network entity 70 (or, more specifically, the module 73 in the embodiment of FIG. 4) may commence monitoring the bitrate with which the current video segment is delivered to the UE 12 for the ABR streaming session (block 58). The module 73 may be in communication with the delivery server 72 (or may be part of it, as mentioned before) to monitor the delivery bitrates for the ABR-delivered video content.

As shown in FIG. 4, the UE-carrying vehicle 84 may be moving away from the base station 74 and toward a geographical area 90 that may experience no or less-than-desired radio coverage. The manifest file for the ABR segment may specify three exemplary bitrates-8 Megabits per Second (8 Mbps), 2 Mbps, and 500 Kilobits per Second (500 Kbps). Depending on the proximity of the UE-carrying vehicle 84 to the serving base station 74 and depending on the condition of the radio interface over the link 85, the video content may be delivered to the client UE 12 with progressively decreasing bitrates. For example, the UE 12 may receive the content/ABR segments through a progressive download via Hypertext Transfer Protocol (http). In that case, the content may not be actually streamed. In any event, the client will choose which segments to pull based on the rate it is filling its buffer. The client (i.e., the UE 12) may pull the content at bitrates that are close to the highest manifest bitrate of 8 Mbps when the UE 12 is geographically closer to the serving base station 74. The delivery bitrate may start to reduce when the UE 12 moves away from the base station 74. The ABR player in the client UE 12 may adapt to these progressively reducing delivery bitrates by automatically selecting a bitrate from the video content's manifest file that is closest to the current delivery bitrate. For example, in case of the UE 12 discussed herein, if the current delivery bitrate is 2.5 or 3 Mbps, the ABR player in the client UE 12 will automatically switch to the 2 Mbps bitrate to allow the player to maintain its internal playback buffer (not shown) filled with video content. Similarly, when the current delivery rate drops to 600 Kbps, the client player in the UE 12 will move to the manifest-specified 500 Kbps rate for receiving the ABR-delivered content. Thus, an ABR client may automatically switch to profiles (i.e., bitrates) represented in the manifest file based on the rate at which the current video segment is being delivered. The ABR client may automatically move to the lowest bitrate in the manifest file if the mobile network is delivering the segments at that bitrate or a slightly higher bitrate.

As part of monitoring the segment delivery bitrate (block 58 in FIG. 3), the network entity 70 (or, more specifically, the module 73 in the embodiment of FIG. 4) may determine at block 60 (FIG. 3) whether the ABR video segment is delivered to the client UE 12 below the predefined threshold level determined earlier (i.e., the applicable threshold value determined at block 54 or block 56). If the video segment is not delivered below the predefined threshold value (at block 54 or block 56) and if the mobile device's video session is still active (at block 62), then the network entity 70 (i.e., the module 73 in the embodiment of FIG. 4) may return to its bitrate monitoring at block 58.

It is understood that radio conditions encountered by the serving BS 74 may affect the content delivery bitrate, which would, in turn, affect the bitrate with which the client device (i.e., the UE 12) "pulls" (or downloads) the ABR video segments from the delivery server 72. There may be a region or "spot" in the serving BS's coverage area where the radio coverage is either low or non-existent. Such an outage region is identified by the reference numeral "90" in FIG. 4. When a client device (here, the UE 12) enters such a region (e.g., because of the mobility of the UE-carrying vehicle 84), the serving BS 74 may end up delivering the video segment at a delivery rate that may be less than the lowest bitrate "authorized" within the associated manifest file (block 54 in FIG. 3) or below a configurable threshold bitrate (in case the manifest file is encrypted) (block 56 in FIG. 3). As a result, the client UE's ABR player may not be able to "fill" its playback buffer with sufficient video content to enable the UE 12 to safely cross the outage region 90 without interrupting or stopping the current playback. At reference numeral "91" in FIG. 4, such a lower delivery rate is shown as 250 Kbps in the context of the vehicle's 84 entry into the outage region 90. On the other hand, the lowest ABR encoded bitrate (in the manifest file) is shown to be 500 Kbps. Thus, if the client player is downloading a video segment at a rate below the predefined threshold value (block 60), the module 73 may become aware of that through its monitoring of the delivery bitrates. As a result, the module 73 may request geographical location information about the client UE 12 from the radio network 15 (i.e., from an appropriate entity or entities in the network 15 such as, for example, the base station 74 serving the UE 12) via known mobile radio positioning/locating Application Programming Interfaces (APIs) (block 64 in FIG. 3). These APIs may use any known positioning or locating method(s) such as, for example, positioning methods based on radio cell coverage; Global Positioning System (GPS), Assisted GPS (A-GPS), Global Navigation Satellite System (GLONASS), Galileo, or other satellite based systems/methods; or Time-Of-Arrival (TOA), Uplink Time Difference Of Arrival (UTDOA), Observed Time Difference Of Arrival (OT-DOA), or Enhanced Observed Time Difference (E-OTD) methods. Generally, additional description of the positioning methods in a cellular network may be found in such 3GPP Technical Specifications (TS) as, for example, the TS 36.305 (E-UTRAN; Stage 2 functional specification of UE positioning in E-UTRAN), the TS 25.305 (Stage 2 functional specification of UE positioning in UTRAN), and TS 43.059 (Functional stage 2 description of Location Services (LCS) in GERAN). Many of these positioning methods may be based on network triangulation, Wi-Fi positioning, and/or mobile device's internal sources. In particular embodiments, the module 73 may request the UE 12—through the BS 74—to provide its geographical location coordinates to the network 15 (and, hence, to the module 73), or may receive UE's geographical location information from a satellite network (not shown).

In FIG. 4, it is indicated at reference numeral "91" that the UE's 12 location coordinates (i.e., the location coordinates of the UE-carrying vehicle 84) are 19.7323 degrees North (latitude) and 155.0412 degrees West (longitude). When the network entity 70 (or the module 73 in the network entity 70) receives this geo-location information of the UE 12 (in response to its request at block 64 in FIG. 3), it may report UE's location coordinates to a Video QoS Location Awareness System/Server 93 in the network entity 70 (block 66, FIG. 3) for storage into an associated database 94, as indicated through reference numeral "97" in FIG. 4. In one embodiment, the system 93 may manage the database 94 as well as storage and retrieval of information from that database 94. If the mobile device video session is still active (block 62), such monitoring of delivery bitrate (block 58) may continue to collect geo-location information for different radio outage areas in the network 15. When the device video session concludes, the network entity 70 may exit the outage learning/monitoring process in FIG. 3 (block 68).

For each UE playing ABR audio-visual content in the network 15, the network entity 70 may monitor respective content delivery bitrate to obtain UE's geographical location coordinates when the delivery bitrate is lower than a predefined threshold level. As shown in FIG. 4, each base station 74-76 in the network 15 may be connected to the network entity 70 and serve respective UEs in its coverage area. As part of building the database 94 with information about radio outage areas across the entire network 15, each base station 74-76 may participate in delivery of ABR video content as well as reporting of UEs' geographical locations (if so requested by the network entity 70). In this manner, clusters of "quality drop spots" (i.e., locations where radio coverage is low or non-existent) on the radio map of the network 15 may be detected and their geographical coordinates stored in the database 94 for future use in controlling a UE's bitrate for downloading the ABR-delivered video content as discussed later with reference to FIGS. 6-8.

Figure 5:
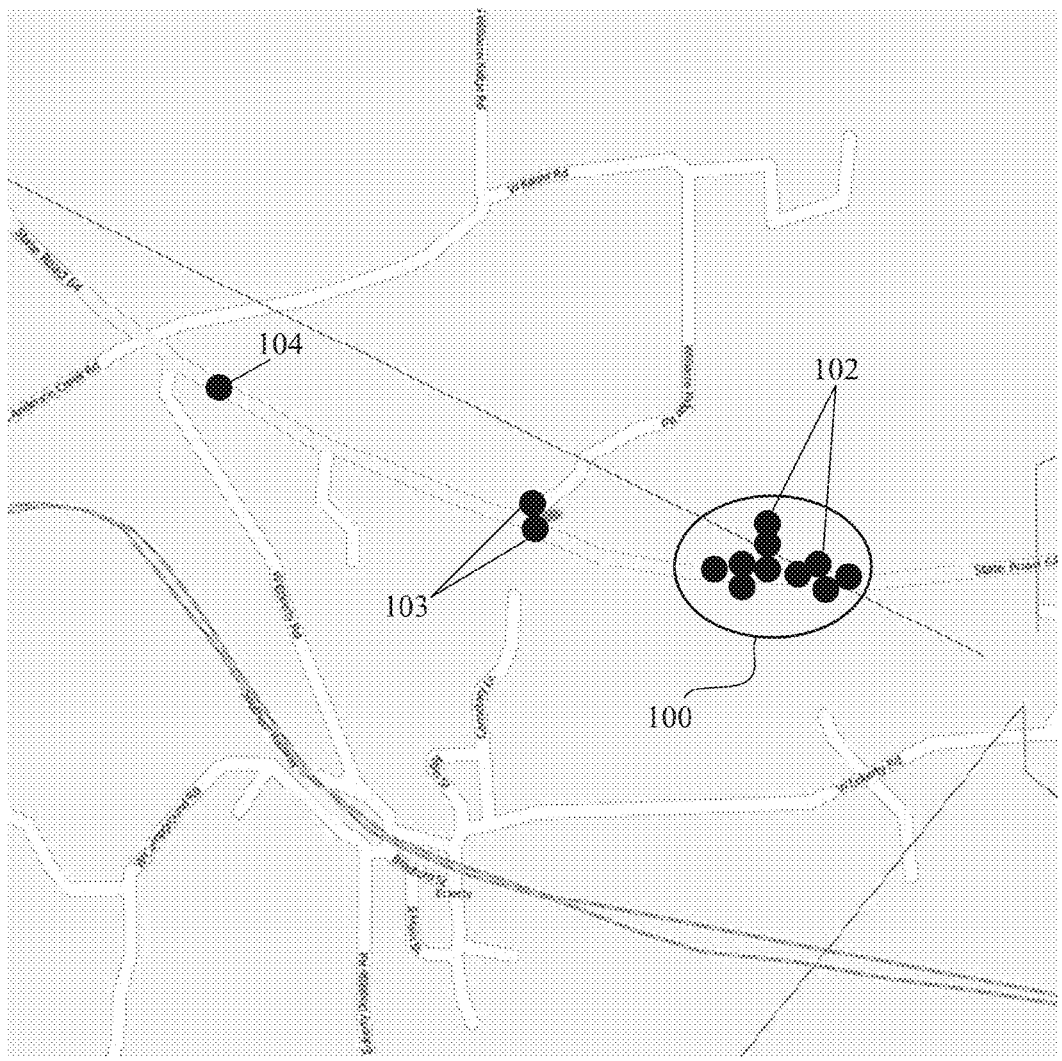
FIG. 5 shows an exemplary map identifying a possible radio "white spot" in the geographical coverage area of a cellular network.

FIG. 5 shows an exemplary map 99 identifying a possible radio "white spot" 100 in the geographical coverage area of a cellular network (e.g., the network 15 in FIG. 1). The "quality drop spots" detected using the methodology of FIG. 3 are shown using individual dots 102-104. In one embodiment, the map 99 may represent a portion of the data outage region 90. A "quality drop spot" is a smaller physical region or area where radio coverage is either non-existent or less-than-desired. A cluster of such "quality drop spots" may be considered as a radio "white spot"—i.e., a larger radio outage region formed by multiple contiguous "quality drop spots." In FIG. 5, such radio "white spot" is shown using a circle and identified using the reference numeral "100." The size of such circle may mark how large the calculated "white spot" is. As mentioned before, geographical location information about these radio outage areas ("quality drop spots" as well as "white spots") may be stored in a network-based central database (e.g., the database 94 in FIG. 4) for later use through APIs. The database 94 can have APIs to other network-based services. For example, a service that uses the methodology in the embodiments of FIGS. 6-8 for the forced control of ABR bitrate of a UE may need the location data from the database 94. That service may use an appropriate API to find out if a UE is about to enter a geographical zone with no or bad coverage. By detecting the geographical borders of the bad coverage regions, better network service behavior can be achieved for any content streaming service (as discussed below with reference to FIGS. 6-8).

Figure 6:
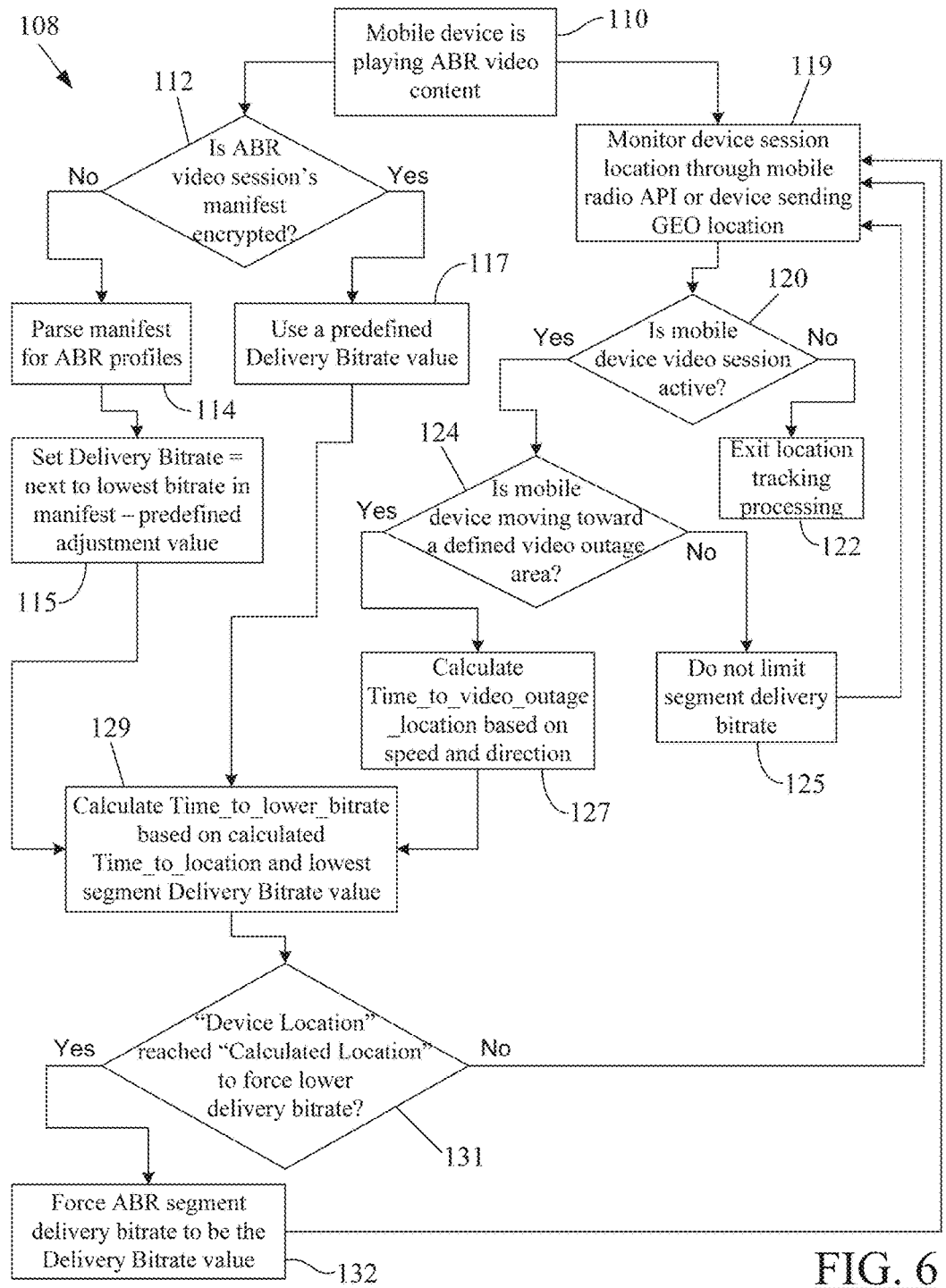
FIG. 6 is an exemplary flowchart depicting various steps of how the ABR bitrate control methodology according to one embodiment of the present disclosure may be implemented.
Figure 7:
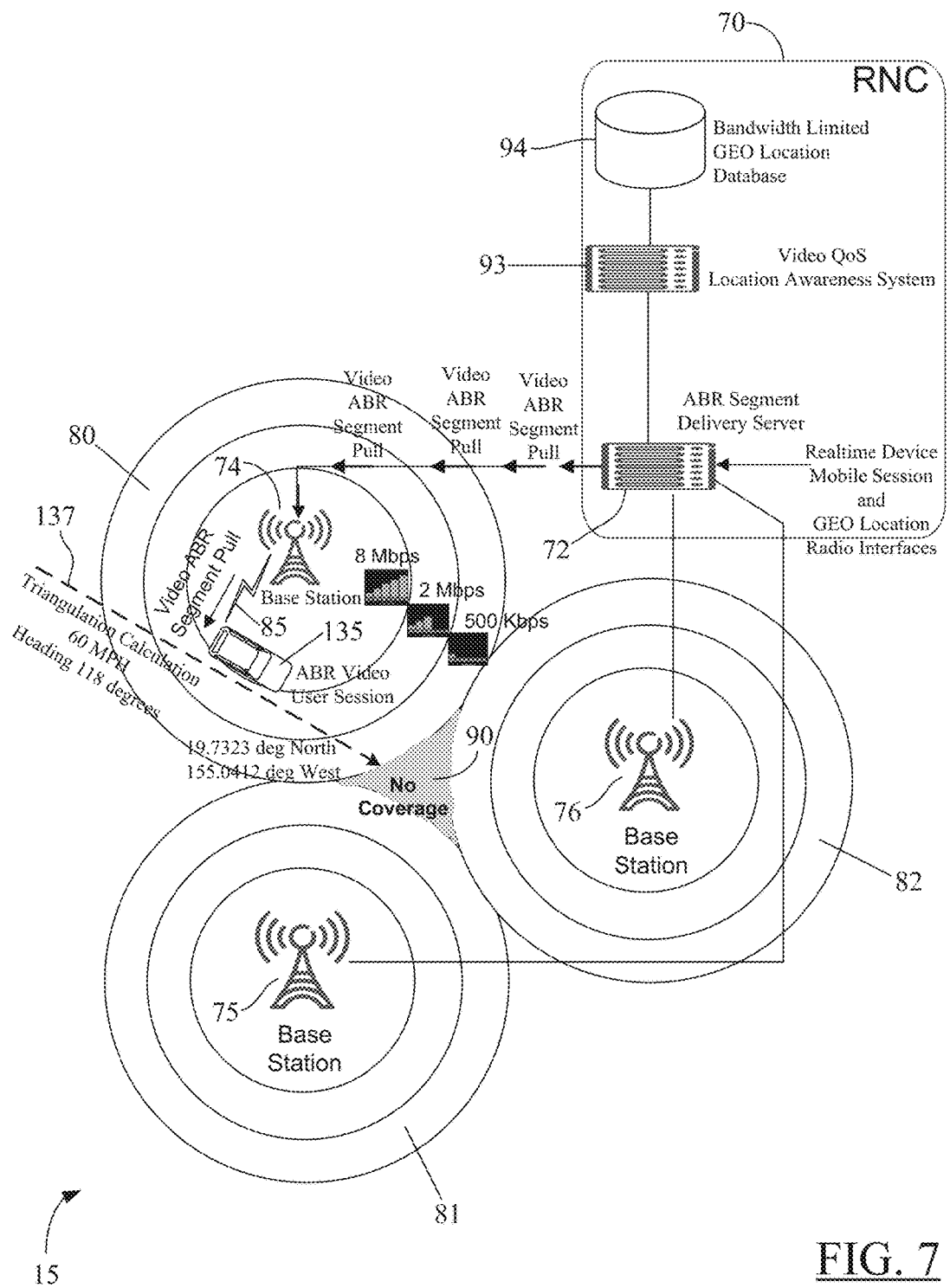
FIGS. 7 and 8 pictorially illustrate how a UE's download bitrate may be controlled by a network entity according to one embodiment of the present disclosure when the UE is heading toward a radio outage area.
Figure 8:
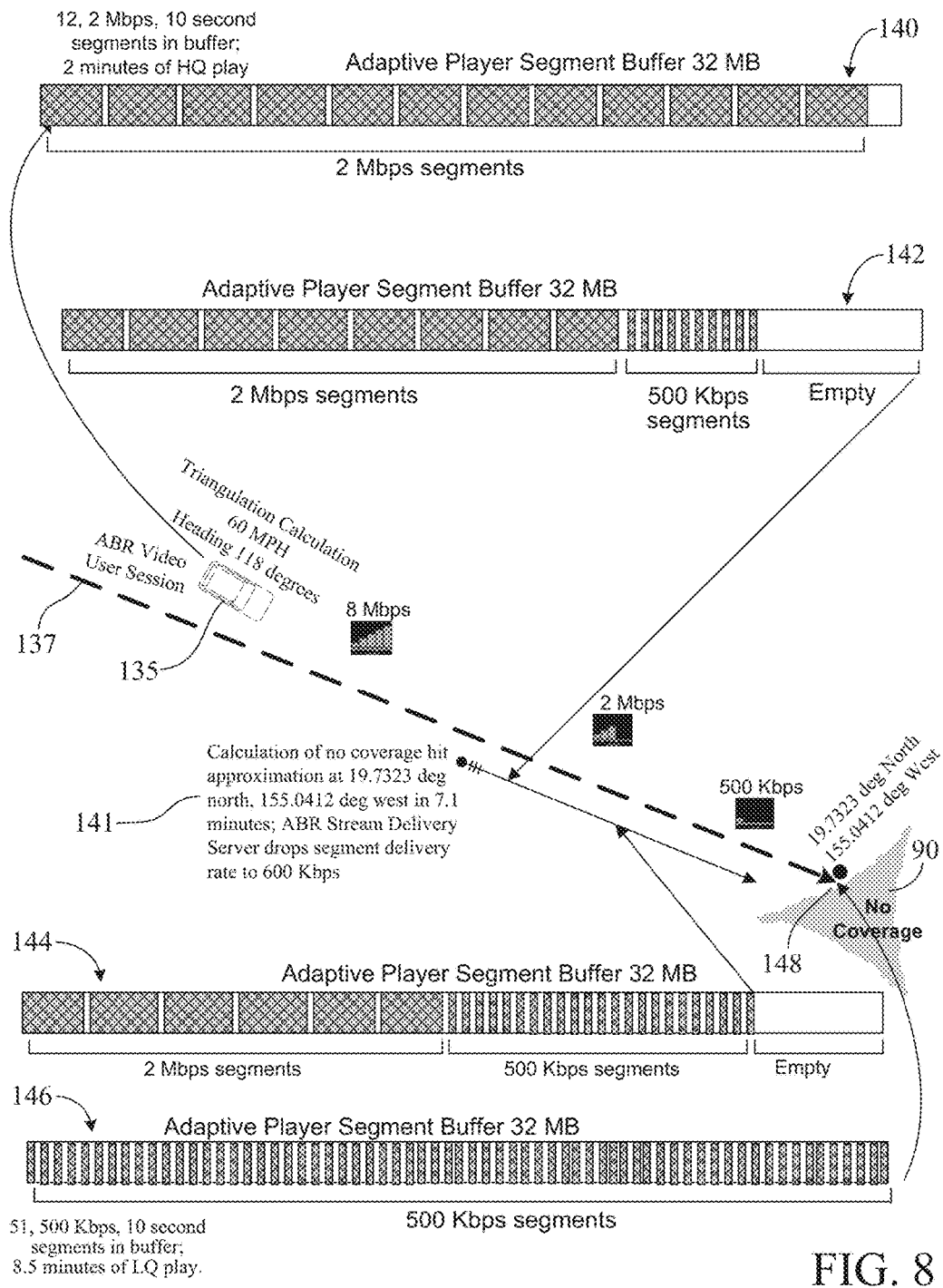

FIG. 6 is an exemplary flowchart 108 depicting various steps of how the ABR bitrate control methodology according to one embodiment of the present disclosure may be implemented. The discussion of FIG. 6 is provided below in conjunction with FIGS. 7 and 8, which pictorially illustrate how a UE's (e.g., the UE 13 in FIG. 1) download bitrate may be controlled by a network entity (e.g., the RNC 70 in FIG. 7) according to one embodiment of the present disclosure when the UE 13 is heading toward a radio outage area (e.g., the area 90 in FIG. 7). In one embodiment, the steps in FIG. 6 that are attributed to the RNC 70 may be performed by the delivery server 72 (FIG. 7) in the RNC 70. It is noted here that because of the same network configurations in FIGS. 4 and 7, the same reference numerals are used for the elements common between these two figures, and further discussion of such similar configuration is not provided herein for the sake of brevity and in view of earlier discussion of FIG. 4. As discussed earlier, FIG. 4 relates to the process of "building" the database 94 with location information about potential radio outage areas in the network 15. In that process, positions of and content delivery rates for different UEs may be monitored to obtain information about "quality drop spots." The information stored in the database 94 may be then used in the embodiments of FIGS. 6-8 to control a client UE's (e.g., the UE 13) download bitrate for network-delivered ABR content. For ease of discussion, although the database creation in the embodiment of FIGS. 3-4 is explained with reference to the UE 12 and although the ABR bitrate control in FIGS. 6-8 is explained with reference to a different UE (i.e., the UE 13), it is understood that both of these UEs may be part of the processes in the embodiments of FIGS. 3-4 and 6-8—i.e., both of these UEs may be targets of the delivery rate monitoring of FIGS. 3-4 as well as the subjects of the ABR bitrate control of FIGS. 6-8.

Referring now to FIG. 6, when a mobile device (e.g., the UE 13) is playing an ABR video content (block 110), the network entity 70 may be configured according to one embodiment of the present disclosure to determine a Delivery Bitrate that may be needed in case the mobile device is heading into an area with less-than-desired data coverage (such as the area 90 shown in FIG. 7). In one embodiment, the ABR segment delivery server 72 may be configured to perform such determination. It is noted here that, in the embodiment of FIG. 7, the module 73 is assumed to be a part of the server 72 and, hence, is not separately shown as is the case in FIG. 4. As part of the Delivery Bitrate determination, the network entity 70 may first ascertain at block 112 whether the ABR video session's manifest file is encrypted. If the manifest file is not encrypted, the network entity 70 (i.e., the server 72 in the embodiment of FIG. 7) may parse that manifest file for ABR profiles or bitrates (block 114) and set the Delivery Bitrate to be a bitrate that is next to the lowest bitrate specified in the manifest file. In one embodiment, a predefined adjustment value may be subtracted from this bitrate to arrive at the Delivery Bitrate, as shown at block 115 (i.e., Delivery Bitrate=next to the lowest bitrate in the manifest file–a predefined adjustment value). The adjustment value may depend on such factors as the current condition of the radio channel between the serving base station 74 and the target UE 13 (as represented by an automobile/vehicle 135 in FIG. 7), prior actual delivery bitrates to UEs for similar video content when those UEs head into radio outage areas, restrictions on video segmenting that may constrain the delivery bitrate, etc. As an example of such Delivery Bitrate at block 115, the delivery server 72 may select it to be 600 Kbps (assuming that the lowest bitrate in the manifest file is 500 Kbps as shown in FIGS. 7 and 8).

On the other hand, if the manifest file is encrypted (block 112), the network entity 70 (i.e., the server 72 in the embodiment of FIG. 7) may use a predefined bitrate as the Delivery Bitrate (block 117). As mentioned earlier with reference to block 56 in FIG. 3, such predefined bitrate may be configured based on a number of factors such as, for example, prior observations of "typical" lowest bitrates in unencrypted manifest files associated with video contents similar in nature to the video content currently being delivered with an encrypted manifest file, actually-used lowest bitrates for delivery of this type of video content (with encrypted manifest file) to other customers/users over a given period of time, etc. More generally, the Delivery Bitrate may be a simple set value or it may be a value automatically determined based on parsing an unencrypted manifest. As in case of the bitrate at block 115, the RNC 70 may similarly select 600 or 650 Kbps as the Delivery Bitrate at block 117 (for an encrypted manifest file).

At block 119, the RNC 70 may then monitor the location of the mobile device (i.e., the vehicle 135 carrying the UE 13) through a mobile radio API (to a location-identifying process or service) or the mobile device may itself send its geo-location information (e.g., GPS coordinates) to the RNC 70. These APIs may use any known positioning or locating method(s), some examples of which are given earlier with reference to discussion of FIGS. 3-4. If the mobile device's video session is no longer active (block 120), the RNC 70 may exit its processing of UE's location-tracking (block 122). However, if the mobile device's video session is still active, the RNC 70 may determine at block 124 if the mobile device (i.e., the UE 13) is moving toward a defined video outage area—i.e., a physical location within the carrier network 15 where radio outage occurs and, as a result, previous drops in the content delivery bitrates have been observed (such as, for example, at block 60 in FIG. 3). The server 72 (which may contain the module 73 as noted earlier) may store in the database 94 geographical coordinates of various radio outage areas in the network 15, as determined using the methodology in FIG. 3. The server 72 may access the database 94 to determine whether the location information received at block 119 indicates UE's geographical proximity or potential for physical proximity to one or more radio outage locations stored in the database 94. For example, as noted at arrow 137 in FIG. 7, a triangulation-based positioning method may indicate to the RNC 70 that the UE-carrying vehicle 135 is heading 118 degrees west at 60 miles per hour (MPH), which may eventually take the vehicle 135 into or in close proximity to the defined video outage area 90 (having geographical coordinates of 19.7323 degrees North and 155.0412 degrees West).

If the RNC 70 determines that the UE 13 is not heading toward the outage area 90, the server 72 in the RNC 70 may not need to limit the video segment delivery rate for the UE 13 (block 125) because the UE 13 would not experience unfavorable radio conditions and, hence, would not face video playback interruption. In that case, the RNC 70 (i.e., the server 72) may return to its location monitoring at block 119.

However, if the RNC 70 determines that the UE-carrying vehicle 135 is indeed heading toward the outage area 90 (as is the case in FIG. 7) where data coverage is low or less-than-desired, the RNC 70 may calculate how long it would take for that vehicle 135 to reach closest to the video outage area 90 based on the vehicle's current speed and direction of travel (block 127). In FIG. 6, this calculation is interchangeably referred by the parameters "Time_to_video_outage_location" or "Time_to_location". Using this calculation at block 127, the network entity 70 may further calculate at block 129 how long it should wait before forcing (e.g., by limiting the bandwidth of the delivered data) or instructing (e.g., via a message) the client UE 13 to switch to a lower bitrate within the manifest file. The forced bandwidth control aspect is shown at block 132 in FIG. 6 and discussed below. In an alternative embodiment, a UE-specific message may be sent from the network entity 70 informing the UE 13 to switch to the lowest bitrate in the currently-played video segment's manifest file.

By preemptively forcing the bitrate change, the network entity 70 will enable the client UE 13 to fill the empty portion of its playback buffer with lower quality video segments, resulting in a larger number of segments pre-downloaded. With more segments in its playback buffer, the client can continue the video playback for a much longer time than with fewer segments at a higher bitrate stream. Thus, by forcing the client to the lowest bitrate and enabling it to fill its internal buffer with lower quality video segments to maximize the video playout length, the network entity 70 may enable the client UE 13 to navigate through the outage area 90 (assuming that the vehicle 135 reasonably maintains the same speed of travel) without video data disruptions. In one embodiment, such "advance" filling of client's playback buffer (with lower quality video segments) just prior to the client device's entry into the outage area 90 may be sufficient to enable the client device to cross that area without running out of video segments during transit. In another embodiment, the network entity 70 may perform a different type of calculation to determine the "proper" or "most suitable" bitrate based on a calculated length of time to navigate the outage 90. This calculation may prevent the client from going to the absolute worst video quality (at the lowest bitrate in the manifest) if the calculated time to navigate through the outage based on various segment bitrates can settle on a higher quality of video (at a higher bitrate) and still fill the client's playback buffer with enough playout time to make it through the outage area 90 without video interruptions.

Referring again to FIG. 6, the calculation of "Time_to_lower_bitrate" at block 129 may be based on the calculated "Time_to_location" (at block 127) and the earlier-determined lowest segment Delivery Bitrate value (at block 115 or 117, whichever is applicable) so that enough video segments may be delivered to the client UE 13 while the UE 13 is still under acceptable data coverage (from the serving BS 74) and before the UE 13 enters the video outage area 90. At block 131, the network entity 70 may ascertain whether the client device's actual physical location (the "Device Location" parameter at block 131) (as reported by the device itself or as determined using one or more previously-mentioned positioning methods) has reached the "Calculated Location" (i.e., the location that the UE-carrying vehicle 135 may reach at the conclusion of the "Time_to_lower_bitrate" at block 129, assuming no significant change in the direction or speed of travel) to force the lower delivery bitrate. If, for any reason (e.g., a significant change in travel direction or speed) the "Device Location" turns out to be different from the "Calculated Location" at block 131, the network entity 70 may return to its monitoring of the device session location at block 119. However, if the "Device Location" is sufficiently close (e.g., within a pre-defined range of travel time such as, for example, 5 to 7 minutes of travel time at the current speed and direction of travel) to the "Calculated Location," the network entity 70 (more particularly, the delivery server 72 in case of the embodiment in FIG. 7, as mentioned earlier) may commence delivery of video segments at the Delivery Bitrate (as determined at blocks 115 or 117, whichever is applicable) (block 132) to force the client UE 13 to switch to the lowest bitrate in the video segment's manifest file. As mentioned earlier, an ABR client may automatically switch to the lowest bitrate in the manifest if the network is delivering the video segment at that bitrate or at a slightly higher bitrate. Thus, the usage of the Delivery Bitrate at block 132 would force the client UE 13 to select the lowest authorized bitrate in the manifest, thereby enabling the client to fill its video playback buffer with sufficient number of video segments (albeit of lower quality) to last through the data outage region 90.

The exemplary pictorial illustration in FIG. 8 shows how the forced bitrate control according to the embodiment in FIGS. 6-7 may enable the UE 13 to have an uninterrupted playback of the ABR-delivered video content while transiting through the data outage region 90. Initially, the UE 13 may be downloading ABR video segments at the bitrate of 2 Mbps. If the UE 13 has a playback buffer of size 32 MBs, that buffer may be able to accommodate twelve (12) such 2 Mbps segments (assuming that each segment contains 10 seconds of video). As a result, the UE 13 would have 2 minutes (12 segments×10 seconds/segment) of High Quality (HQ) playback time as shown by the buffer configuration at reference numeral "140." The UE 13 would continue to play this HQ video from its buffer. When the UE 13 starts approaching the outage area 90 as indicated by the arrow 137 (also shown in FIG. 7), the network entity 70 may determine—based on UE's speed and direction of travel—that the UE 13 would "hit" the outage region 90 in the next 7.1 minutes. This is indicated at reference numeral "141" in FIG. 8. In one embodiment, whenever a UE is within 7 to 8 minutes of travel distance from the outage region 90, the network entity 70 may force the UE to switch to a lower bitrate for playback of video content (e.g., the lowest bitrate in the video content's manifest file). Hence, in the embodiment of FIG. 8, when the network entity 70 determines that the UE 13 is heading toward the data outage region 90 and would "hit" that region in the next 7.1 minutes, the network entity 70 may reduce its segment delivery bitrate to 600 Kbps as indicated at reference numeral "141." As a result, the UE 13 would be forced to select the lowest bitrate in the manifest (i.e., 500 Kbps) to download video segments from the network's content delivery server 72. Instead of the previous HQ segments at 2 Mbps, the UE 13 would be now forced to start maintaining its playback buffer with Low Quality (LQ) video segments downloaded at the lowest manifest bitrate of 500 Kbps. This is illustrated by the buffer configuration at reference numeral "142." This process may continue as shown by the buffer configuration at reference numeral "144" and conclude when the entire playback buffer is filled with such LQ video segments as shown by the buffer configuration at reference numeral "146." Finally, when the UE 13 is physically closest to the outage region—as indicated by reference numeral "148"—the UE's playback buffer would be filled with sufficient 500 Kbps segments to allow the UE to "cross" the outage area 90 without playback interruption. In the embodiment of FIG. 8, it is shown that the UE's 32-MB playback buffer is now filled with 51 LQ (500 Kbps) video segments, each segment containing 10 seconds of video. This would allow the UE 13 to have 8.5 minutes (51 segments×10 seconds/segment) of LQ play. If the UE-carrying vehicle 135 is traveling at 60 MPH, this would allow uninterrupted video playback for the next 8.5 miles of travel distance, which may be significantly more than the "size" (in miles) of the outage region 90 in the vehicle's 135 direction of travel. Generally, when the playback buffer is already full, a new segment may get loaded into the buffer when a previously-stored segment completes its playback. Thus, once a client completes watching a 10-second segment, the next 10-second segment may be downloaded into the buffer, and the process may continue. In one embodiment, the segment size may be 5 seconds, 10 seconds, or any other pre-defined size.

Figure 9:
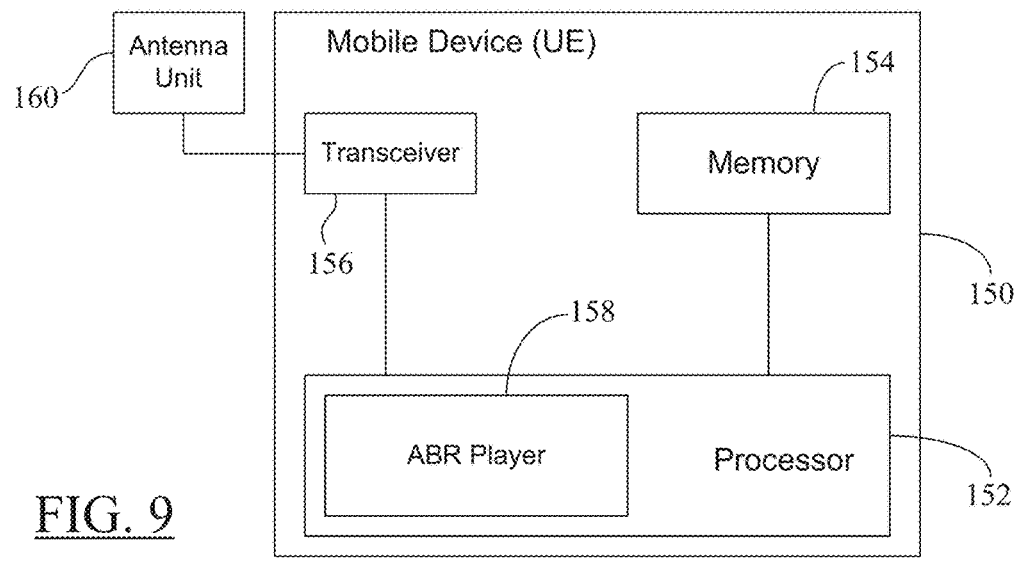
FIG. 9 shows a block diagram of an exemplary mobile device according to one embodiment of the present disclosure.

FIG. 9 shows a block diagram of an exemplary mobile device 150 (which represents both of the UEs 12-13 in FIG. 1) according to one embodiment of the present disclosure. As noted earlier, the mobile device 150 may be a UE, an Access Terminal (AT), or any other wireless device operating in a carrier network (such as the network 15 in FIG. 1). The wireless device 150 may include a processor 152, a memory 154 (which may, in some embodiments, also include memory on UE's Subscriber Identity Module (SIM) card), and a transceiver 156. The processor 152 may include an ABR player 158. Upon execution of the program code of the player 158 by the processor 152, the processor may configure the wireless device 150 to perform various ABR content playback-related tasks such as, for example, downloading the network-delivered video content at a manifest-specified bitrate, displaying the played video content on a device display, requesting additional video content when playback buffer starts to empty, etc.

The memory 154 may store data or other related communications received from a network entity (e.g., the base station 20 in FIG. 1 or the RNC 70 in FIGS. 4 and 7) in the carrier network 15. For example, in one embodiment, the memory 154 may store video segments received from the base station 20. These data may be later used by the processor 152 to playback the received ABR video content using the ABR player 158.

The transceiver 156 may communicate with the processor 152 to perform transmission/reception of data, control, or other signaling information (via an antenna unit 160) to/from the network entity with which the wireless device 150 may be in communication. The transceiver 156 may be a single unit or may comprise of two separate units—a transmitter (not shown) and a receiver (not shown). The antenna unit 160 may include one or more antennas. Alternative embodiments of the wireless device 150 may include additional components responsible for providing additional functionality, including any of the functionality identified herein (such as, for example, receiving audio-visual content from a network entity and playing that content, reporting geo-location coordinates of the wireless device to the network entity, receiving an indication of bitrate switch from the network entity and then switching to the lowest bitrate specified in the manifest file, etc.) and/or any functionality necessary to support the solution as per the teachings of the present disclosure.

In one embodiment, the wireless device 150 may be configured (in hardware, via software, or both) to implement device-specific aspects of outage learning (FIGS. 2A and 3-5) and ABR bitrate switch (FIGS. 2B and 6-8) as per teachings of the present disclosure. The software or program code may be stored in the memory 154 and executable by the processor 152 in response to, for example, receiving appropriate indications from a network entity. For example, when existing hardware architecture of the device 150 cannot be modified, the functionality desired of the device 150 may be obtained through suitable programming of the processor 152. The execution of the program code (by the processor 152) may cause the processor to perform as needed to support the outage learning and forced bitrate control solutions as per the teachings of the present disclosure. Thus, although the wireless device 150 may be referred to as "performing," "accomplishing," or "carrying out" (or similar such other terms) a function or a process or a method step, such performance may be technically accomplished in hardware and/or software as desired. The network operator or a third party (e.g., manufacturer or supplier of the device 150) may suitably configure the device 150 (e.g., through hardware and/or software based configuration of the processor 152) to operate and reciprocate with the network entity (e.g., the base station 20 or the RNC 70, etc.) as per the particular requirements of the present disclosure discussed above. For example, the device 150 may be configured to report its geo-location coordinates to the network entity (either periodically on its own or upon receiving a "trigger" or "request" therefor from the network entity) to assist the network entity in "building" a database of radio outage regions within a carrier network, preemptively switch to the lowest bitrate in the manifest file upon receiving an indication for the switch from the network entity, etc. As a result, the mobile device 150 may experience steady, uninterrupted playback of the network-delivered audio-visual content even if the device is at a location that has no or less-than-desired data coverage.

Figure 10:
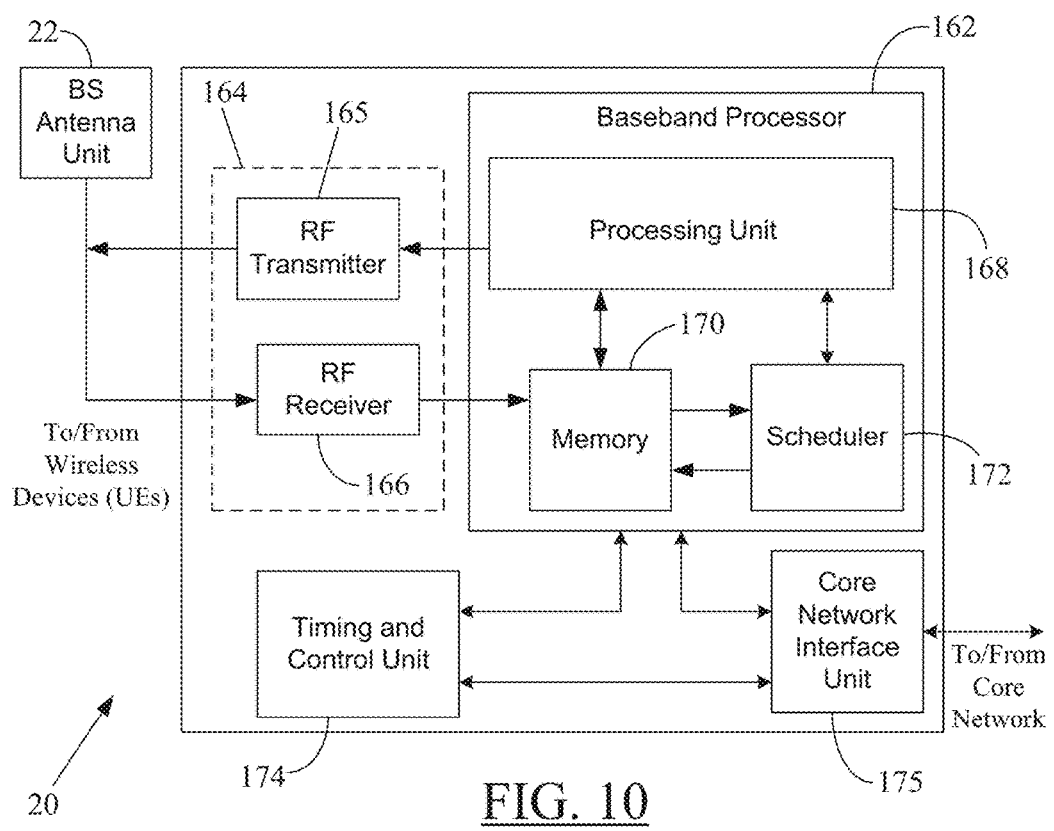
FIG. 10 depicts an exemplary block diagram of a base station that may function as a network entity according to one embodiment of the present disclosure.

FIG. 10 depicts an exemplary block diagram of a base station (e.g., the base station 20 in FIG. 1, which is representative of the base stations 74-77 in FIGS. 4 and 7) that may function as a network entity according to one embodiment of the present disclosure. In one embodiment, the base station 20 may be an eNB. In one embodiment, the base station 20 may be configured to perform various functionalities of the network entity 70 discussed earlier with reference to FIGS. 2-4 and 6-8. Thus, for example, the base station 20 may be configured to perform outage learning and, hence, the database building aspect discussed with reference to FIGS. 3-4. The base station 20 may be configured to further perform the ABR bitrate control of client UEs as per the embodiments of FIGS. 6-8.

The base station 20 may include a baseband processor 162 to provide radio interface with the wireless devices (e.g., the mobile device 150 in FIG. 9 or the mobile devices 12-13 in the carrier network 15 in FIG. 1) via base station's Radio Frequency (RF) transceiver unit 164 coupled to the base station's antenna unit 22. The transceiver unit 164 may include RF transmitter 165 and RF receiver 166 units coupled to the antenna unit 22 as shown. In one embodiment, the processor 162 may receive transmissions (e.g., uplink and/or downlink channel condition related information, neighboring cell measurement reports, geographical location information, requests for ABR-delivered video content, etc.) from the wireless device 150 via the combination of the antenna unit 22 and the receiver 166, whereas the base station's transmissions (e.g., a message to a UE with instructions to switch to a lower bitrate for downloading the delivered video content, a query for a mobile device's geographical location information, scheduling-related messages, etc.) to the wireless device 150 may be carried out via the combination of the antenna unit 22 and the transmitter 165.

The processor 162 may be configured (in hardware and/or software) to perform various actions mentioned above as well as discussed with reference to FIGS. 2-4 and 6-8. In that regard, the processor 162 may include a processing unit 168 coupled to a memory 170 and a scheduler 172 to enable the processor 162 to perform various steps illustrated in FIGS. 2-3 and 6 and discussed in detail hereinbefore. In one embodiment, the memory 170 may be a separate unit—i.e., not an internal part of the processor 162 (as in FIG. 10), but coupled to it to provide requisite storage. In another embodiment, the memory 170 may function as a database (like the database 94 in FIGS. 4 and 7) of network regions having less-than-desired coverage for radio data transmissions. The memory 170 may contain program code that, upon execution by the processing unit 168, may configure the processor 162 to perform various steps discussed hereinbefore with reference to FIGS. 2-3 and 6. For example, the processing unit 168 may execute the program code to monitor ABR-delivered video's delivery bitrates to collect information about radio data outage areas within an operator's network, and may later use that information to force UEs to switch to lower bitrates when heading toward such outage areas. The processing unit 168 may be in communication with the memory 170 to process and store relevant information for the corresponding cell site (e.g., identities of UEs or wireless devices operating within the cell, channel condition reports and/or neighbor cell measurement reports received from wireless devices, location information received from UEs playing ABR content, etc.).

A scheduler (e.g., the scheduler 172 in FIG. 10) may be part of the base station's processor 162 and may provide the Uplink (UL) and Downlink (DL) scheduling decisions for the wireless device 150 based on a number of factors such as, for example, QoS (Quality of Service) parameters, device buffer status, UL and DL channel condition related information received from device, device capabilities, etc. In one embodiment, the network entity 20 may include separate UL and DL schedulers (not shown in FIG. 10) as part of its baseband processor 162. The scheduler 172 may have the same data structure as a typical scheduler in an eNB in an LTE system. The processor 162 may also provide additional baseband signal processing (e.g., mobile/wireless device registration, channel signal information transmission, radio resource management, etc.) as required. The processing unit 168 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 162 may employ distributed processing in certain embodiments.

Some or all of the functionalities described above and earlier with reference to FIGS. 2-8 as being provided by a network entity (such as a base station, a wireless access node/point, a base station controller, and/or any other type of mobile communications node) may be provided by the processing unit 168 executing instructions stored on a computer-readable data storage medium, such as the memory 170 shown in FIG. 10.

The network entity 20 in the embodiment of FIG. 10 may further include a timing and control unit 174 and a core network interface unit 175. The control unit 174 may monitor operations of the processor 162 and the network interface unit 175, and may provide appropriate timing and control signals to these units. The interface unit 175 may provide a bi-directional interface for the base station 20 to communicate with its core network (or other network-based control entity) to facilitate administrative and call/data-management functions for mobile subscribers operating in the corresponding cell site of the carrier network (e.g., the operator network 15 in FIG. 1).

Alternative embodiments of the base station 20 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. Some or all aspects of the methodology provided herein (related to learning about the network-based radio outage areas and then preemptively controlling a UE's download bitrate for the ABR-delivered video content) may be implemented in a computer program, software, or firmware incorporated in a computer-readable storage medium (e.g., the memory 154 in FIG. 9 and/or the memory 170 in FIG. 10) for execution by a general purpose computer or a processor (e.g., the processor 152 in FIG. 9 or the processing unit 168 in FIG. 10). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 170 may employ distributed data storage with/without redundancy.

The foregoing describes a system and method that utilize a learning system to maintain a data set of geographical locations where network data coverage is low (i.e., less than desired). When it is determined that a client (i.e., a mobile device) is moving towards such an area, the client is forced or instructed to switch to a lower bitrate stream of segments in order to force the client's playback buffer to fill itself with enough low-quality video segments to travel through or cross the area of low data coverage without video playback interruption. Due to the preemptive forcing of the client mobile device to switch to a lower bitrate while traveling through a geographical area with low data coverage, the ABR streaming system according to the teachings of the present disclosure allows the client device to maintain a certain minimum level of Quality of Service (QoS) when moving through network areas with spotty data coverage. Furthermore, an ABR streaming system according to certain embodiments of the present disclosure can rapidly adapt to ad-hoc issues such as inclement weather, structural interference, or radio coverage interruption because of a pre-stored data set of geo-locations where network data coverage is low or non-existent.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of building a database of geographical locations in a cellular network that have a less-than-desired radio coverage, wherein the method comprises performing the following using a network entity in the cellular network:
for a mobile device operating in the cellular network and playing an audio-visual content through an adaptive streaming process, determining a minimum threshold bitrate authorized under the adaptive streaming process;

monitoring whether a current audio-visual segment is being delivered to the mobile device at a delivery bitrate that is lower than the authorized minimum threshold bitrate;

when the delivery bitrate is lower than the authorized minimum threshold bitrate, obtaining geographic location coordinates for the mobile device; and reporting the geographic location coordinates for storage in the database, wherein determining the authorized minimum threshold bitrate includes:

determining whether a manifest file associated with the adaptively delivered audio-visual content is encrypted;

responsive to the determining that the manifest file is unencrypted, using a lowest bitrate in the manifest file as the authorized minimum threshold bitrate; and responsive to the determining that the manifest file associated with the adaptively delivered audio-visual content is encrypted, setting a predefined default bitrate as the authorized minimum threshold bitrate, the default bitrate being independent of one or more bitrates specified in the manifest file and being based on at least one of (i) prior observations of lowest bitrates in unencrypted manifest files associated with content substantially same as the audio-visual content currently being delivered, and (ii) actually-used lowest bitrates for delivery of substantially same audio-visual content to other users over a given period of time.

2. The method of claim 1, wherein using the lowest bitrate in the manifest file as the authorized minimum threshold bitrate includes the following:

parsing the manifest file to obtain the lowest bitrate contained therein; and setting the lowest bitrate in the manifest file as the authorized minimum threshold bitrate.

3. The method of claim 1, wherein obtaining the geographic location coordinates includes at least one of:

receiving the geographic location coordinates through an Application Programming Interface (API) supported by the cellular network;

receiving the geographic location coordinates from the mobile device; and receiving the geographic location coordinates from a satellite network.

4. The method of claim 1, wherein reporting the geographic location coordinates includes sending the geographic location coordinates to a system that manages the database.

5. A network element, comprising:

one or more processors; and one or more persistent memory modules coupled to the one or more processors, the one or more persistent memory modules containing program instructions which, when executed by the one or more processors, perform the following acts:

for a mobile device operating in a cellular network and playing an audio-visual content through an adaptive streaming process, determining a minimum threshold bitrate authorized under the adaptive streaming process;

monitoring whether a current audio-visual segment is being delivered to the mobile device at a delivery bitrate that is lower than the authorized minimum threshold bitrate;

when the delivery bitrate is lower than the authorized minimum threshold bitrate, obtaining geographic location coordinates for the mobile device; and reporting the geographic location coordinates for storage in the database, wherein determining the authorized minimum threshold bitrate includes:

determining whether a manifest file associated with the adaptively delivered audio-visual content is encrypted;

responsive to the determining that the manifest file is unencrypted, using a lowest bitrate in the manifest file as the authorized minimum threshold bitrate; and responsive to the determining that the manifest file associated with the adaptively delivered audio-visual content is encrypted, setting a predefined default bitrate as the authorized minimum threshold bitrate, the default bitrate being independent of one or more bitrates specified in the manifest file and being based on at least one of (i) prior observations of lowest bitrates in unencrypted manifest files associated with content substantially same as the audio-visual content currently being delivered, and (ii) actually-used lowest bitrates for delivery of substantially same audio-visual content to other users over a given period of time.

6. The network element of claim 5, wherein the program instructions for using the lowest bitrate in the manifest file as the authorized minimum threshold bitrate further include instructions for:

parsing the manifest file to obtain the lowest bitrate contained therein; and setting the lowest bitrate in the manifest file as the authorized minimum threshold bitrate.

7. The network element of claim 5, wherein the program instructions for obtaining the geographic location coordinates further include instructions for performing at least one of:

receiving the geographic location coordinates through an Application Programming Interface (API) supported by the cellular network;

receiving the geographic location coordinates from the mobile device; and receiving the geographic location coordinates from a satellite network.

8. The network element of claim 5, wherein the program instructions for reporting the geographic location coordinates further include instructions for sending the geographic location coordinates to a geolocation system that manages the database.

9. A non-transitory computer-readable medium having program instructions stored thereon which, when executed by one or more processors of a network element, perform the following acts:

for a mobile device operating in a cellular network and playing an audio-visual content through an adaptive streaming process, determining a minimum threshold bitrate authorized under the adaptive streaming process;

monitoring whether a current audio-visual segment is being delivered to the mobile device at a delivery bitrate that is lower than the authorized minimum threshold bitrate;

when the delivery bitrate is lower than the authorized minimum threshold bitrate, obtaining geographic location coordinates for the mobile device; and reporting the geographic location coordinates for storage in the database, wherein determining the authorized minimum threshold bitrate includes:

determining whether a manifest file associated with the adaptively delivered audio-visual content is encrypted;

responsive to the determining that the manifest file is unencrypted, using a lowest bitrate in the manifest file as the authorized minimum threshold bitrate; and responsive to the determining that the manifest file associated with the adaptively delivered audio-visual content is encrypted, setting a predefined default bitrate as the authorized minimum threshold bitrate, the default bitrate being independent of one or more bitrates specified in the manifest file and being based on at least one of (i) prior observations of lowest bitrates in unencrypted manifest files associated with content substantially same as the audio-visual content currently being delivered, and (ii) actually-used lowest bitrates for delivery of substantially same audio-visual content to other users over a given period of time.

10. The non-transitory computer-readable medium of claim 9, wherein the program instructions for using the lowest bitrate in the manifest file as the authorized minimum threshold bitrate further include instructions for:

parsing the manifest file to obtain the lowest bitrate contained therein; and setting the lowest bitrate in the manifest file as the authorized minimum threshold bitrate.

11. The non-transitory computer-readable medium of claim 9, wherein the program instructions for obtaining the geographic location coordinates further include instructions for performing at least one of:

receiving the geographic location coordinates through an Application Programming Interface (API) supported by the cellular network;

receiving the geographic location coordinates from the mobile device; and receiving the geographic location coordinates from a satellite network.

12. The non-transitory computer-readable medium of claim 9, wherein the program instructions for reporting the geographic location coordinates further include instructions for sending the geographic location coordinates to a geolocation system that manages the database.

* * * * *